United States Patent

[11] 3,592,526

| [72] | Inventor | John F. Dreyer |
| | | c/o Polacoat Incorporated 9750 Conklin Road, Cincinnati, Ohio 45242 |
| [21] | Appl. No. | 841,857 |
| [22] | Filed | July 15, 1969 |
| [45] | Patented | July 13, 1971 |

[54] MEANS FOR ROTATING THE POLARIZATION PLANE OF LIGHT AND FOR CONVERTING POLARIZED LIGHT TO NONPOLARIZED LIGHT
8 Claims, 5 Drawing Figs.

[52] U.S. Cl. .................................... 350/159, 350/147, 350/157
[51] Int. Cl. ..................................... G02b 5/30
[50] Field of Search ........................... 350/147, 150, 152, 154, 157, 159, 160

[56] References Cited

UNITED STATES PATENTS

| 3,431,044 | 3/1969 | Clark ............................ | 350/159 X |
| 3,499,702 | 3/1970 | Goldmacher et al. ........ | 350/150 |

FOREIGN PATENTS

| 441,274 | 1/1936 | Great Britain ................ | 350/150 |

OTHER REFERENCES

Pinsky, " Reflective Liquid Crystal Displays" ELECTRONICS WORLD (November, 1968) pp. 29 and 58

*Primary Examiner*—David Schonberg
*Assistant Examiner*—Paul R. Miller
*Attorney*—Melville, Strasser, Foster & Hoffman ABSTRACT: A light transmissive device which will rotate the plane of polarized light and will also depolarize plane polarized light passed through the device, said device comprising a pair of directionally oriented supporting surfaces, such as unidirectionally rubbed glass or plastic plates, rotatable relative to each other and separated by a thin film of a nonoptically active nematic liquid crystal material, the device acting to rotate the plane of the polarized light when the directionally oriented surface first contacted by the entering light is either parallel or perpendicular to the plane of polarization of the entering light and the remaining directionally oriented surface is rotated so as to bring its oriented surface to the desired plane of polarization for the exiting light, the device also acting to convert plane polarized light to nonpolarized light when the oriented surface first contacted by the entering light lies at an angle of 45° with respect to the plane of polarization of the entering light and the directionally oriented surfaces are parallel to each other.

△ VIEWING SIDE

LIGHT SOURCE (2)

INVENTOR/S
John F. Dreyer

BY Melville, Strasser, Foster and Hoffman
ATTORNEYS 3,592,526

MEANS FOR ROTATING THE POLARIZATION PLANE OF LIGHT AND FOR CONVERTING POLARIZED LIGHT TO NONPOLARIZED LIGHT

BACKGROUND OF THE INVENTION

While it has been proposed to rotate the plane of polarization of polarized light, it has heretofore been necessary to utilize materials such as mica or stretched plastic to rotate the plane of polarization to the desired degree. However, the use of either mica and stretched plastic induces elliptical or circular polarization of the light, with accompanying color effects which, in many instances, are undesirable in precision optical instruments. There are also applications wherein it is desirable to rotate the plane of polarization of relatively large areas of light; and the sizes of the devices heretofore available have been limited by the size of the mica or cellulose acetate sheets which are available. In addition, it has not been possible to truly and uniformly depolarize plane polarized light without scattering or defusing the light which is passed through the depolarizing system.

In contrast to the foregoing, the instant invention provides a simple and effective means for rotating the plane of polarization of any source of light to any desired degree of rotation or to completely depolarize the light which is passed through the device, irrespective of the initial plane of polarization of the light or on the degree to which it is polarized.

RESUME OF THE INVENTION

The instant invention will find utility in various optical instruments wherein it is desired to rotate the plane of polarization of the entering light or to depolarize such light. It will also find utility in literally any device which is sensitive to, or affected by, polarized light, as for example a photometer.

The essence of the invention lies in the utilization of a thin film of a nonoptically active nematic liquid crystal material between a pair of supporting surfaces which themselves are directionally oriented. The oriented surfaces can be either transparent or translucent, preferably being in the form of essentially rigid glass or plastic plates. The orientation of the surfaces which are in contact with the film of nematic liquid crystal material is obtained by rubbing the surfaces, the direction of rubbing determining the direction of orientation obtained. The rubbing may be readily done with a cloth using a slurry of rouge in water to assist in the rubbing operation. It is important that the oriented surfaces be clean and not contaminated by the presence of any cationic or other material which will be attracted to the oriented surfaces so as to form an insulating film which will prevent the orientation effect on the liquid crystal material.

The thickness of the supporting plates does not constitute a limitation of the invention, nor does the particular material from which they are formed. Glass plates can be readily directionally oriented, as can most plastics except for those which are cross-linked. However, where plastic plates are employed, care must be taken so that the plates will be inert with respect to the nematic liquid crystal compound. Plastic materials, such as ethyl cellulose and methyl methacrylate resin, have been found highly suited for the purpose. Crystalline materials, with the exception of hard crystalline surfaces, such as sapphire, also has a Beilby layer which is permanently oriented by rubbing.

There are many known nematic liquid crystal materials which may be employed. Preferably, the liquid crystal material should be essentially colorless and it should be inert to the plastic or other surfaces with which it is in contact. In addition, it should not be optically active with reference to the levo or dextro rotary power of the material such as is obtained by unsymmetrical groups on the molecules. Both lyotropic and thermotropic organic nematic materials may be used, as well as eutectic mixtures of the nematic compounds. Many of the organic thermotropic nematic compounds must be maintained at an elevated temperature, i.e., above room temperature, in order for them to exhibit the nematic mesophase, but a number of recently discovered nematic compounds are optically active at temperatures as low as 0° C. A very useful nematic material for room temperatures work is that obtained from the condensation of para normal butyl aniline and anisaldehyde. Additional examples of nematic compounds which are particularly suited for the practice of the instant invention are found in a copending application in the name of Elwood Streble, Ser. No. 817,143, filed Apr. 17, 1969, and entitled "Organic Thermotropic Nematic Compounds." These compounds, which comprise parasubstituted alkyl or alkoxy benzylidenephenylamines having also para, or ortho and para substituents of the phenylamine ring, are particularly suited for the practice of the instant invention in that they have low viscosities and can be readily handled and formed into thin films. Exemplary of lyotropic compounds are bromophenanthrene sulfonic acid, or amaranth in proper concentration with a solvent.

The thickness of the nematic liquid crystal film between the supporting surfaces is not critical, although film thicknesses between 0.0005 and 0.015 inch are preferred. Below 0.0005 inch color effects tend to appear, whereas as the film thickness increases, the film tends to become hazy, and films having a thickness in excess of 0.015 inch will lose their clarity. A preferred film thickness is 0.001 inch. The liquid character of the room temperature materials permits easy rotation of the supporting plates without destroying their rubbed orientation; and consequently the angle of rotation of the light can be adjusted accurately to any desired degree.

The desired film thickness can be readily maintained by spacing apart the supporting surfaces by means of a gasket or mask of the desired film thickness. Another method for maintaining proper spacing, particularly where large surface areas are involved, is to incorporate a small quantity of inert particles, such as silica beads or glass powder, having cross-sectional dimensions equal to that of the desired spacing.

DESCRIPTION OF THE PREFERRED EMBODIMENTS

Figures 1, 3:
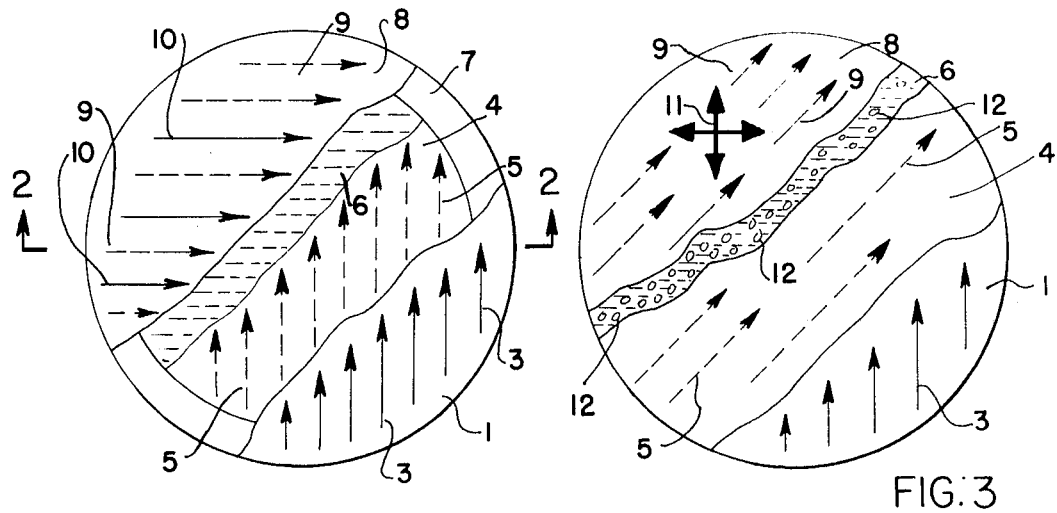
FIG. 1 is a schematic plan view with parts broken away illustrating the principles of the invention as applied to a device for rotating the plane of polarized light.
FIG. 3 is a schematic plan view with parts broken away illustrating the principles of the invention as applied to a device for depolarizing a source of polarized light.
Figure 2:
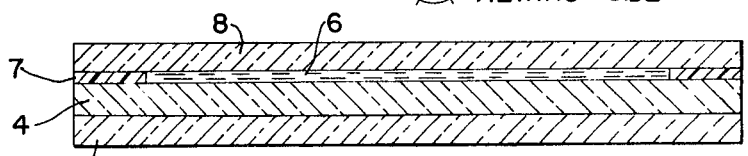
FIG. 2 is a vertical sectional view taken along the line 2-2 of FIG. 1.

Referring first to FIGS. 1 and 2, a polarizing filter is indicated at 1 which is adapted to receive light from a light source 2. Upon passage of the light through the polarizing filter 1, the light will be completely polarized, its plane of polarization being indicated by the solid arrows 3, as seen in FIG. 1. A first supporting surface 4 overlies the polarizing filter, the supporting surface comprising a glass or plastic plate the uppermost surface of which has been unidirectionally oriented by rubbing, the direction of orientation of the first supporting surface being indicated by the dotted arrows 5. The film of nematic liquid crystal material is indicated at 6 and, in the embodiment illustrated, the liquid film is enclosed within a gasket or mask 7 the thickness of which determines the thickness of the liquid crystal film. Such mask may be conveniently formed from a transparent material, such as cellulose acetate. A second supporting surface 8 overlies the liquid crystal film and its undersurface is also unidirectionally oriented, again by rubbing, as indicated by the dotted arrows 9.

With the supporting surfaces oriented in the manner illustrated in FIG. 1, the plane of polarization of the exiting light on the viewing side of the device will be in the direction of the solid arrows 10, the plane of polarization being parallel to the direction of orientation of the second supporting surface, as indicated by the dotted arrows 9. Thus, the angle between the directions of orientation of the two supporting surfaces, i.e., the angle defined between the dotted arrows 5 and 9, determines the degree to which the plane of polarization of the light is rotated. In the embodiment illustrated, it is shown rotated through an angle of 90°.

It will be understood, however, that the angle of rotation may lie anywhere between 0° and 360°, depending upon the extent to which the supporting surface 8 is rotated relative to the supporting surface 5. Thus, by rotating the second surface 8, the plane of polarization of the exiting light can be rotated at will to any desired angle relative to the plane of polarization of the entering light. The degree of rotation is uniform for all visible wave lengths and no color effects are observed if a proper thickness of the nematic liquid crystal film is maintained and the film is chosen so as to have no optical activity.

The same rotational effect can be achieved by rotating the first supporting surface 4 so that its direction of orientation, lies at right angles with respect to the plane of polarization of the entering light. In other words, the orientation of the supporting surface on the side of the device where the light enters may be either parallel or perpendicular to the plane of polarization of the entering light. Otherwise, as will be discussed hereinafter, some of the entering polarized light will be transformed into nonpolarized light.

It also should be pointed out that the device may be used without the polarizing filter 1. While such filter is preferred to unify the plane of polarization of the entering light, the device will be operative without the polarizing filter to whatever extent polarized light is emitted by the original light source. Consequently, the invention may be utilized with any source of light irrespective of its degree of polarization or its plane of polarization.

Where it is desired to depolarize the light passing through the device, the parts will be oriented in the position illustrated in FIG. 3, wherein it will be seen that the first supporting surface 4 has been rotated so that its direction of orientation, as exemplified by the dotted arrows 5, lies at an angle of 45° with respect to the plane of polarization of the entering light, as exemplified by the solid arrows 3. In addition, the second supporting surface 8 has been rotated so that its direction of orientation, as exemplified by the dotted arrows 9 is parallel to the direction of orientation of the first supporting surface. Where this condition exists, the exiting light will be nonpolarized, as indicated by the crossed arrows 11. In other words, when the oriented directions of both supporting surfaces are parallel and lie at an angle of 45° with respect to the plane of polarization of the entering light, the exiting light will be completely depolarized. Under these circumstances, the device becomes a means for converting plane polarized light into nonpolarized light without inducing elliptical or circular polarization of the light; and such depolarization takes place uniformly throughout the spectrum.

If the direction of orientation of either or both of the supporting surfaces is rotated so as to lie at any angle less than, or greater than, 45° with respect to the plane of polarization of the entering light (other than 0° or 90°), a combination of the effects of rotating the plane of polarization and depolarizing the light will take place. In other words, as the direction of orientation of the supporting surfaces moves away from an angle of 45° with respect to the plane of polarization of the entering light, the degree of polarization will progressively decrease, but at the same time the plane of polarization of the polarized light which passes through the device on the viewing side will be rotated, the degree of rotation depending upon the extent to which the polar oriented surfaces are rotated.

In the embodiment illustrated in FIG. 3, it will be noted that the gasket or mask which establishes the desired thickness of the nematic liquid crystal material has been eliminated, the supporting surfaces being separated from each other by the desired film thickness by means of inert particles 12, such as silica beads or glass powder, dispersed in the liquid crystal film.

Figure 5:
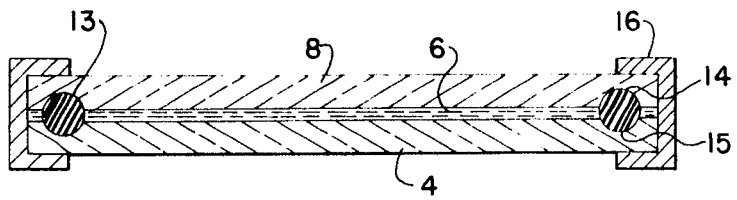
FIG. 5 is a vertical sectional view taken along the line 5-5 of FIG. 4.
Figure 4:
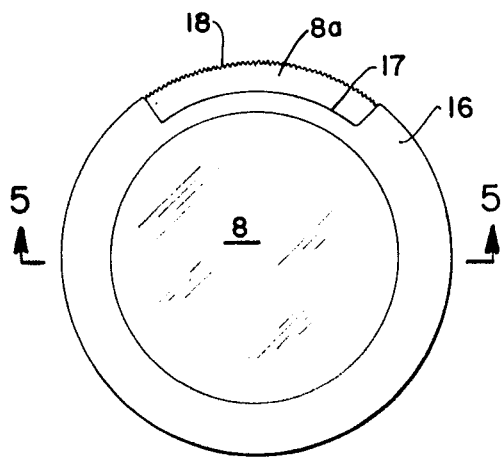
FIG. 4 is a plan view of a simple form of device in accordance with the invention.

FIGS. 4 and 5 illustrate an exemplary form of device in accordance with the instant invention wherein the liquid crystal film 6 is retained between the supporting surfaces 4 and 8 by means of an O-ring 13 which may be conveniently received in mating annular grooves 14 and 15 formed in the film contacting surfaces of the supporting plates. The assembly may be conveniently mounted in a frame 16 having a cutaway portion 17 which acts to expose marginal edge portions of the supporting plates, one such edge portion being indicated at 8a in FIG. 4. For ease of rotation, the edges of the supporting plates may be milled, as indicated at 18, or otherwise configured to permit ready engagement for rotational movement.

It should be evident that diverse types of frames and mounting means may be employed, depending upon the size and intended mode of operation of the device. For example, assemblies may be made up with the direction of orientation of the two supporting surfaces in fixed relationship to each other, their directions of orientation being parallel if the device is to be used to depolarize the light; or their directions of orientation may be at any desired angle where it is desired to rotate the plane of polarization by a fixed angle.

Similarly, by employing liquid crystal materials which are no longer fluid, fixed filters or cells can be made. For example, it has been found that isobutyl methacrylate resin can be added to a number of liquid crystal materials, depending upon their chemical constitution, up to 50 percent by volume. The combination may be made by using a suitable mutual solvent, such as toluol. After coating one of the oriented supporting surfaces with the liquid crystal-resin mixture, the solvent is evaporated and the second oriented surface is placed in contact with the film so formed.

Various other modifications may be made in the invention without departing from its spirit and purpose. For example, by rubbing different parts of the supporting surfaces in different directions, patterns can be produced which will give corresponding variations in the rotation or depolarization of the entering light, thereby producing interesting and variable visual effects.

The embodiments of the invention in which an exclusive property or privilege is claimed are defined as follows. I claim:

1. In combination in a device for altering the plane of polarization of polarized light, a first light transmissive supporting plate having a directionally oriented surface, a second light transmissive supporting plate also having a directionally oriented surface, and a thin film of a nematic liquid crystal material juxtaposed between and in contact with the directionally oriented surfaces of said supporting plates, said supporting plates being rotatable relative to each other.

2. The device claimed in claim 1 wherein said film of liquid crystal material has a thickness of from 0.0005 to 0.015 inch.

3. The device claimed in claim 2 including a polarizing filter mounted to the outside of one of said supporting plates.

4. The device claimed in claim 3 wherein at least one of said supporting plates is rotatable relative to said polarizing filter.

5. The device claimed in claim 1 including means for spacing apart the said supporting plates by a distance equal to the desired thickness of said film of nematic liquid crystal material.

6. The device claimed in claim 5 wherein said last-named means comprises a gasket or mask interposed between the marginal edges of said supporting plates, the said liquid crystal material lying within the confines of said gasket or mask.

7. The device claimed in claim 5 wherein said last-named means comprises essentially uniform particles of an inert material dispersed in said liquid crystal material.

8. A light transmissive device which will rotate the plan of polarized light and will also depolarize plane polarized light, said device comprising a pair of unidirectionally oriented essentially planar surfaces rotatable relative to each other, said surfaces being separated by a thin film of a nonoptically active nematic liquid crystal material in contact with the said surfaces, the device serving to rotate the plane of the polarized light when the unidirectionally oriented surface first contacted by light entering the device is either parallel or perpendicular to the plane of polarization of the entering light and the remaining unidirectionally oriented surface is rotated so as to bring its oriented surface to the desired plane of polarization for the exiting light, the device serving to convert plane polarized light to nonpolarized light when the unidirectionally oriented surface first contacted by the entering light lies at an angle of 45° with respect to the plane of polarization of the entering light and both unidirectionally oriented surfaces are parallel.